United States Patent [19]

Marantette

[11] Patent Number: 4,762,447
[45] Date of Patent: Aug. 9, 1988

[54] DUAL-PLANE HIGH-SPEED COLLET

[75] Inventor: William F. Marantette, Torrance, Calif.

[73] Assignee: Optima Industries, Inc., Torrance, Calif.

[21] Appl. No.: 910,540

[22] Filed: Sep. 23, 1986

[51] Int. Cl.⁴ .................. B23B 31/04; B23C 5/26
[52] U.S. Cl. .................. 409/131; 279/4; 279/50; 279/51; 408/239 R; 409/232; 409/234
[58] Field of Search .............. 279/4, 41 R, 41 A, 43, 279/44, 45, 50, 74, 87, 49, 54, 1 F, 23, 46, 51, 103; 408/239 R, 239 A; 409/131, 132, 232, 234

[56] References Cited

U.S. PATENT DOCUMENTS

| | | | |
|---|---|---|---|
| 2,228,685 | 1/1941 | Benjamin | 279/49 |
| 2,410,439 | 11/1946 | Garnier | 279/54 |
| 2,462,155 | 2/1949 | Benjamin et al. | 279/50 |
| 2,467,569 | 4/1949 | Walters | 279/50 |
| 2,515,183 | 7/1950 | Benjamin et al. | 279/4 |
| 3,210,088 | 10/1965 | Williamson et al. | 279/51 X |
| 3,727,928 | 4/1973 | Benjamin | 279/1 L |

FOREIGN PATENT DOCUMENTS 515561 11/1920 France .................. 279/51

Primary Examiner—Z. R. Bilinsky
Attorney, Agent, or Firm—Gausewitz, Carr & Rothenberg

[57] ABSTRACT

The collet includes a compressible basket having a central opening to receive a tool shank and two exterior surfaces tapering in opposite directions. One tapered exterior surface engages a matching tapered interior surface of a hollow rotatable shaft that receives it. The other tapered exterior surface engages a matching tapered interior surface of a wedge received in the shaft and movable axially relative to it. The angles of the tapers are such that they are self holding. The collet is closed by moving the wedge which compresses the basket sequentially at the two tapered surfaces, locking the tapers. The force on the wedge is released after this, leaving the tapers locked without external force as the tool is gripped in two locations during operation of it. The collet is actuated by a pneumatic power cylinder with two pistons having portions that engage an extension of the wedge for moving it, after which these portions are spaced from the wedge extension so that they do not interfere with the operation of the tool. The position of the power cylinder is adjustable to assure clearance at the wedge extension.

28 Claims, 2 Drawing Sheets

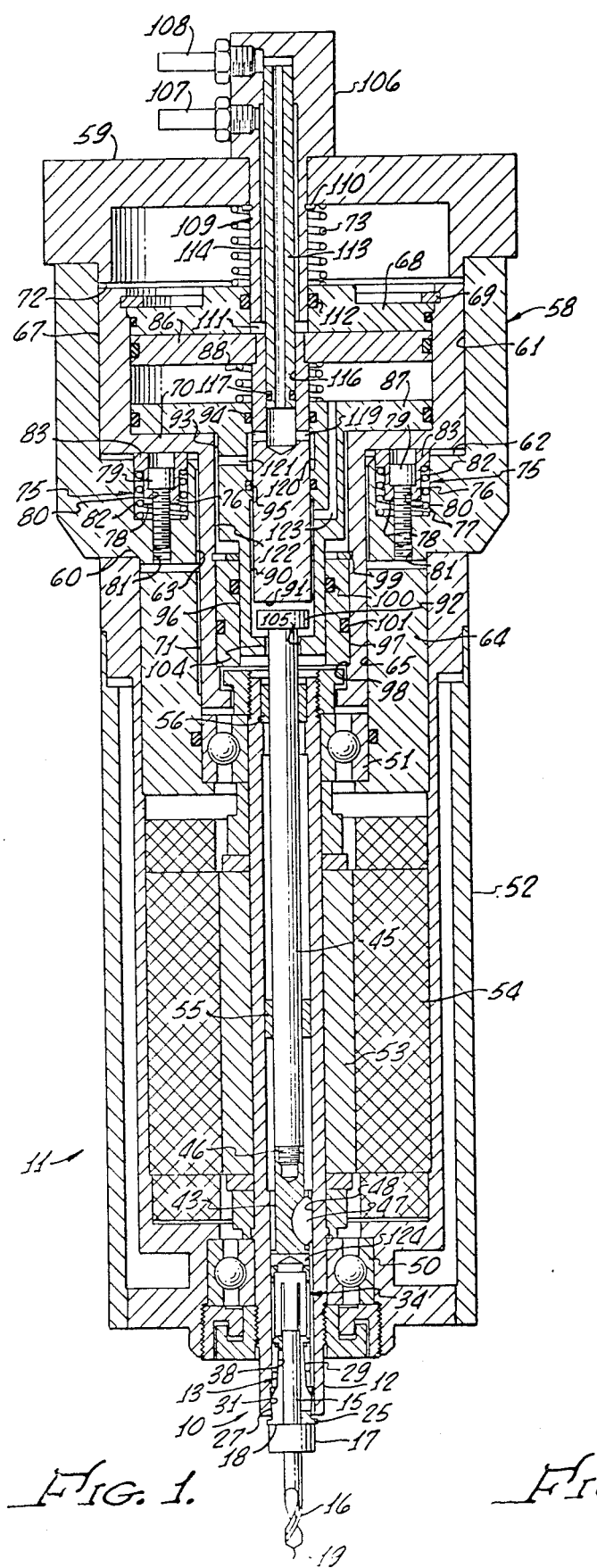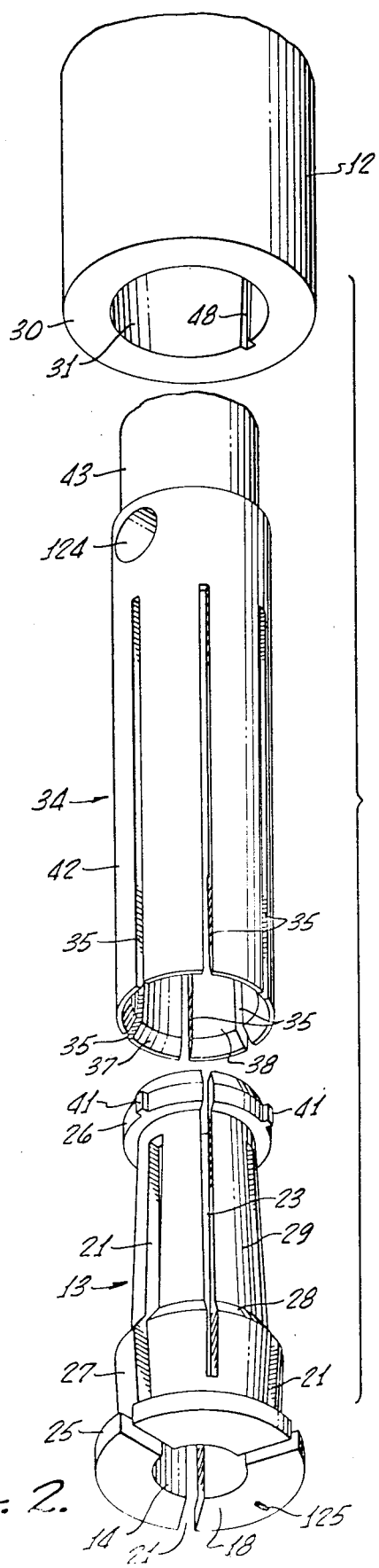
FIG. 1.
FIG. 2.

DUAL-PLANE HIGH-SPEED COLLET

BACKGROUND OF THE INVENTION

The collets of machines which operate at high rotational speeds, such as drilling machines and routers used in the production of printed circuit boards, long have caused problems of considerable significance. One has involved the necessity for achieving balance of the rotating components of the spindle. Conventional spindles incorporate strong springs for holding the collets in their closed positions. These springs must flex as the collet is moved from the opened to the closed position, causing them to change their positions and, hence, destroying rotational balance. Even a small amount of imbalance in machines that rotate at high speeds will greatly reduce bearing life. Frequent expensive overhauls become necessary.

Moreover, a conventional collet will grip the shank of the tool bit only at a single plane. This results because of inevitable manufacturing tolerances. Tapers and diameters rarely if ever can be matched exactly so that the gripping force necessarily is localized at some circumferential portion of the tool shank, rather than extending along the length of the collet. Side pressure on the tool, such as encountered by a router bit, is reversed with each revolution. As a result, the tool rocks slightly as it rotates. Gradually, it can creep out of the collet. This condition exists despite the customary application of an augmented holding force on the collet of a router.

SUMMARY OF THE INVENTION

The present invention provides a collet construction offering many advantages and overcoming the difficulties of the prior art. Tools are gripped more securely, balance is greatly improved, yet the construction of the collet is simple and it is easily manufactured. According to the invention, the collet includes two tapered surfaces used in activating it, the tapers extending in opposite directions. As a result, the shank of the tool becomes gripped at two spaced locations affording greatly improved stability. Runout of the tip of the rotating tool is minimal. Moreover, the tapers of the collet are of the self-holding variety which require no force other than friction to maintain them in their locked condition. Tapers of this nature have been defined as within the range of 2° to 3° or less. By utilizing self-holding tapers, the collet of this invention requires no springs. Having no springs, the collet can be balanced easily and will retain its balance under all conditions. The collet is opened and closed by simply applying an axial force to one of the collet components with no external force being applied during the operation of the tool.

The collet of this invention is of simplified construction, being made up of only two components, a basket having external tapers, and a wedge having an internal taper, these components cooperating with surfaces of a hollow shaft of the machine tool. Therefore, the parts are small which improves the ability to achieve perfect balance, and the rotating mass is significantly reduced. The result is greater bearing life for the spindle, and less spindle runout throughout its life. The holding force is sufficiently great with the collet of this invention to avoid the necessity for a separate booster to provide increased air pressure for operating the collets used for holding router bits. Normal shop air pressure will suffice.

One component of the collet of this invention is a basket member having two exterior tapers in opposite directions, the lowermost of which bears against a tapered surface at the lower end of the hollow shaft of the machine tool. The upper taper is engaged by an inner taper of the wedge member used in activating the collet. The basket is slotted from both ends so that it is radially compressible. As the collet is closed, the tapers act in series, the wedge compressing the basket at its upper end and moving the basket to compress it at its lower taper. This reduces the closing force required. Nevertheless, by gripping the shank in two locations, the collet provides an increased holding force.

The wedge member is operated by a rod extending from it which has an end flange used in moving it in two directions. The force for moving the rod comes from a cylinder having two opposed pistons. These pistons have extensions, one positioned on one side of the flange of the rod, and the other on the other side of that flange. To close the collet, one piston is moved by air pressure to push the rod to force the tapered surfaces together. Then that piston is retracted so that the flange is not engaged as the tool is rotated. The other piston is moved in engaging the flange to pull the rod causing the tapers to slide to the released position. Again, the piston is returned to its original position so that there is no drag on the flange of the rod. The pistons bottom out on the ends of the cylinder and the position of the cylinder is adjustable to assure clearance at the flange of the rod.

BRIEF DESCRIPTION OF THE DRAWINGS

FIG. 1 is a longitudinal sectional view of a spindle incorporating the collet of this invention;

FIG. 2 is an exploded perspective view of the components of the collet separated from each other;

DETAILED DESCRIPTION OF THE INVENTION

Figure 3:
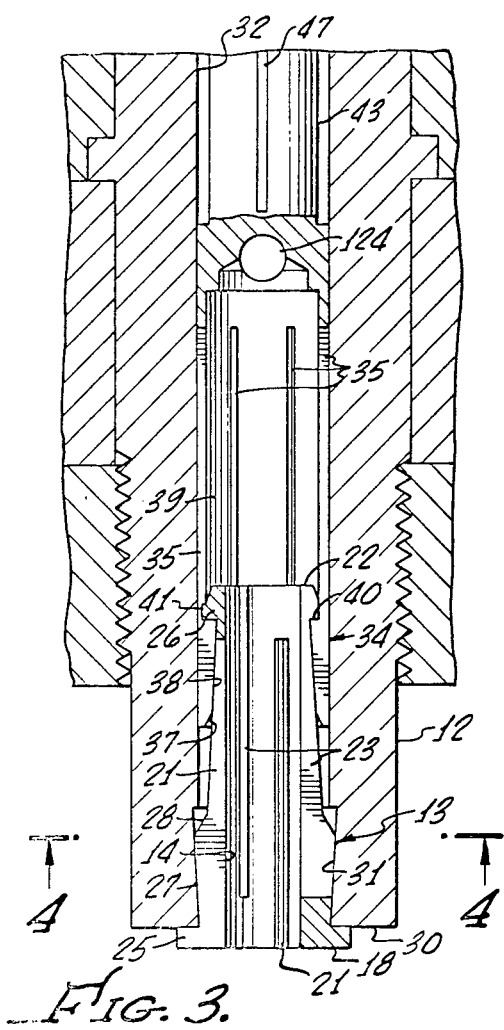
FIG. 3 is an enlarged fragmentary longitudinal sectional view of the collet and the lower portion of the spindle.

The collet 10 of this invention is illustrated in association with a spindle 11 of a high speed drilling machine of the type used for drilling holes in printed circuit boards. The collet 10 is equally usable with routers or combined drilling and routing machines. Other than the collet 10 and the actuating mechanism for the collet, which is described below, the spindle 11 is conventional.

The collet 10 is located at the lower end of the hollow shaft 12 of the spindle 11. The inner component of the collet is a tubular basket 13 of hardened spring steel, shown separately in FIG. 2, which has an axial cylindrical opening 14 through it that complementarily receives the shank 15 of a drill 16 to be rotated by the shaft 12. The conventional depth setting collar 17 on the drill 16 engages the lower end 18 of the basket 13 for properly locating the projection of the drill tip 19 from the collet.

The basket 13 is provided with three equally spaced narrow axial slots 21 which extend inwardly from the end 18 and stop short of the opposite end 22. The slots 21 occupy approximately 90% of the length of the basket 13. Three similar but slightly narrower slots 23, intermediate the slots 21, extend inwardly from the end 22 to a location close to the end 18. The slots 21 and 23 provide the basket 13 with the ability to expand and contract in the radial direction.

Exteriorly, the basket 13 includes a radial flange 25 projecting outwardly at the end 18, and another radial flange 26 adjacent the end 22. The basket 13 is of relatively large exterior diameter for a short distance inwardly of the end flange 25, being provided with a frustoconical exterior surface 27 that tapers toward the flange. This is a shallow taper, preferably at at angle of 3°. The surface 27 connects, through a bevel 28, to a second and longer frustoconical surface 29 that tapers in the opposite direction to the end flange 26. Again, the taper is shallow, preferably 3°.

Figure 5:
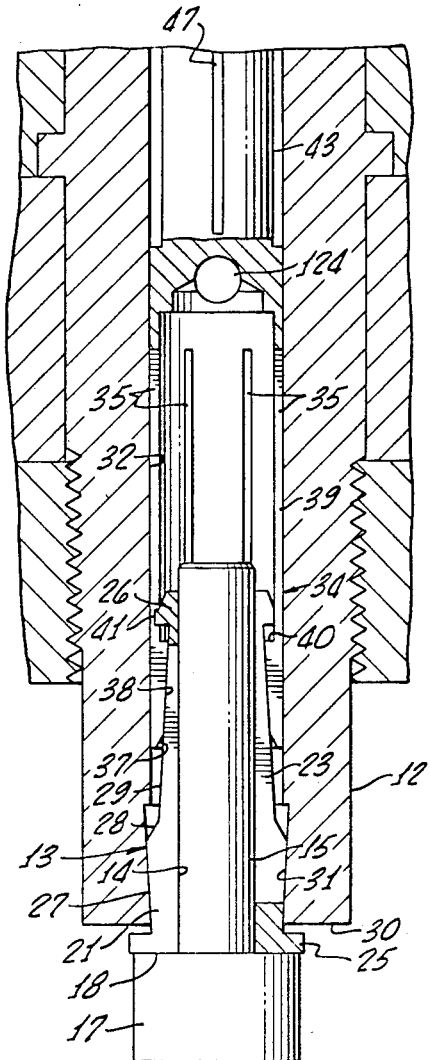
FIG. 5 is a longitudinal sectional view of the collet gripping a cutting tool.
Figure 4:
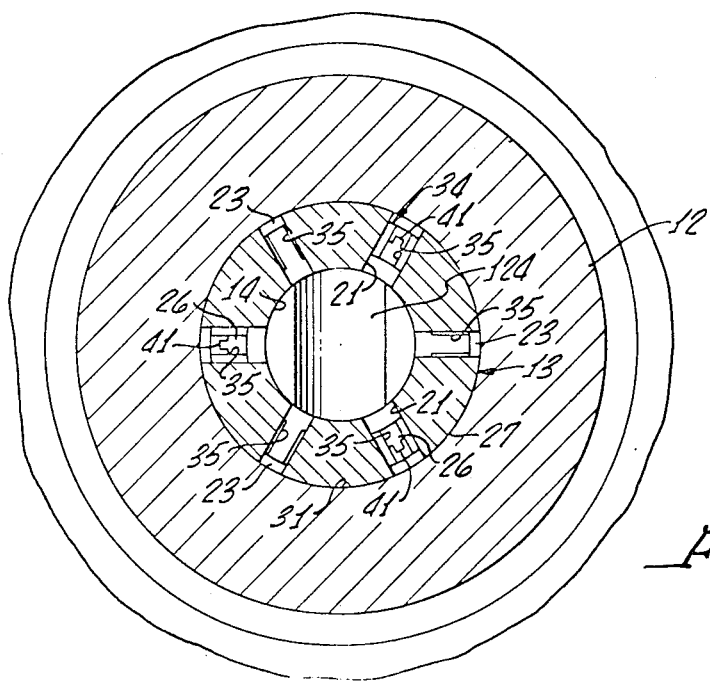
FIG. 4 is an enlarged transverse sectional view taken along line 4—4 of FIG. 3.

The basket 13 fits within the lower end of the shaft 12 with the end flange 25 of the basket positioned just beyond the radial end surface 30 of the shaft, as may be seen in FIGS. 3 and 5. Inwardly of the end surface 30, the interior surface 31 of the shaft, which is longer than the basket surface 27, is tapered at an angle to match the taper of the surface 27 which it engages. Thus, the surface 31 is at a 3° taper in the example given. Beyond the tapered surface 31 the interior surface 32 of the shaft is cylindrical.

Within the surface 32 of the shaft 12 is a wedge member 34 the lower portion of which is hollow and receives the upper end part of the basket 13. The lower section of the wedge member 34 is provided with six equally spaced axial slots 35 which are similar to but narrower than the slots 21 and 23 in the basket 13. The slots 35 extend inwardly from the bottom end 36 of the wedge member. Hence, the lower portion of the wedge member 34 can expand and contract. Prior to assembly in the shaft 12, the lower part of the wedge member is opened up to allow the basket 13 to fit within it.

Interiorly, the wedge member 34 includes chamfered lower edge 37 which connects to a frustoconical surface 38 that decreases in diameter inwardly of the end 36. The tapered surface 38 of the wedge member 34 matches the taper of the surface 29 of the basket 13, being at the same 3° angle. The upper part of the basket surface 29 is longer than the tapered surface 38 of the wedge member 34, with its upper portion being received within the surface 38. The upper end flange 26 of the basket is positioned axially inwardly of the surface 38 of the wedge at a larger cylindrical interior surface 39 of the latter. A radial shoulder 40 connects the tapered surface 38 to the cylindrical surface 39 of the wedge member 34.

Projecting radially outwardly from the flange 26 of the basket 13 are three short tabs 41, best seen in FIG. 2, which fit within the slots 35 in the wedge member 34. This indexes the basket 13 and the wedge 34 rotationally. Inasmuch as there are six slots in the wedge member 34, there are six possible relative rotational positions for the basket 13. In attaining near zero runout of the drill, the basket 13 and wedge member 34 may be assembled within the shaft 12 in each of these six positions. The runout is measured at each relative position of the basket 13 and wedge member 34, with final assembly being at the location where runout is minimum. If desired, the basket 13 may be lightly ground or polished after assembly to further minimize runout.

The wedge member 34 has a cylindrical exterior surface 42 on its lower portion which makes a slip fit within the cylindrical surface 32 of the shaft 12. The upper end portion 43 of the wedge member 34 is of reduced diameter and provided with a threaded opening in its upper end. An elongated rod 45 (FIG. 1) engages the upper end of the upper portion 43 of the wedge member 34, forming a continuation of it. A threaded projection 46 on the lower end of the rod 45 meshes with the threads in the opening 44 of the wedge member 34 to connect the rod and the wedge member.

The upper portion 43 of the rod also carries a key 47 which fits within a keyway 48 in the shaft 12. This couples the wedge member 34 to the shaft 12.

The rod 45 extends upwardly through the hollow shaft 12 to the mechanism 49 at the upper end part of the spindle 11 which actuates the collet. This mechanism is described below. The shaft 12 rotates within lower and upper ball bearings 50 and 51 supported in the housing 52 of the spindle. Between the bearings 50 and 51 is the armature 53 of the motor that drives the shaft 12 and rotates within the stationary field 54. Guide collars 55 and 56 within the shaft 12 bear against both the inner wall of the shaft and the outer surface of the rod 45 to center the rod with respect to the axis of the shaft.

At the upper end of the spindle 11 the housing section 58 is of enlarged diameter, closed by an upper end cap 59. A transverse wall 60 is at the lower end of the housing section 58. Interiorly, the housing section 58 defines a cylindrical chamber 61 having a radial surface 62 at its lower end at the wall 60. A cylindrical opening 63, smaller in diameter than the chamber 61, extends through the center of the transverse wall 60. Beneath the transverse wall 60 is a sleeve 64 held within the lower housing section 52 above the field winding 54. The outer race of the ball bearing 51 is supported by the sleeve 64. The interior surface 65 of the sleeve 64 is of the same diameter and forms a continuation of the opening 63 in the transverse wall 60 of the upper housing section 58.

Within the chamber 61 is a cylinder 67 at the upper end of which is a transverse cylinder head 68 held to the cylinder by a lock ring 69. The cylinder 67 has a transverse wall 70 opposite from the cylinder head 68, from the center of which projects a cylindrical extension 71 which is longer than the cylinder 67 and of smaller diameter. The cylindrical extension 71 fits within the opening 63 in the transverse wall 60 and the interior surface 65 of the sleeve 64. The cylinder 67 has a slip fit within the chamber 61, being movable axially a short distance relative to the housing 58 between the transverse surface 62 at the lower end and a shoulder 72 that projects axially inwardly from the inside edges of the end cap 59 at the upper end. A compression spring 73, positioned between the end cap 59 and the cylinder head 68, biases the cylinder 67 downwardly or toward the surface 62.

An opposing upward force on the cylinder 67 is provided by two identical adjustable positioning units 75 located on diametrically opposite sides of the cylindrical extension 71 within the transverse wall 60. Each unit 75 includes a cup-shaped member 76 received in a cylindrical opening 77, having an open upper end and a radial wall 78 at its lower end. A screw 79 has its head within the cup-shaped member 76 and its threaded shank extending through an opening 80 in the bottom wall 78 of the member 76 and into a threaded opening 81 in the transverse wall 60. A compression spring 82 bears against the radial wall 78 at one end and at the opposite end engages the underside of a rim 83 at the upper end of the cup-shaped member 76. The spring 82, therefore, biases the cup-shaped member 76 of each unit 75 upwardly so that its upper end bears against the radial wall 70 of the cylinder 67. This pushes the cylinder 67 upwardly. The combined force of the two springs 82 is greater than that of the spring 73 so that the cylinder 67 will assume the position shown in FIG. 1 where it is intermediate the shoulder 72 and the wall 62 as the heads of the screws 79 form stops that limit the upward travel of the two cup-shaped members 76 and thus of the cylinder 67. Rotation of the screws 79, therefore, controls the positions of the cup-shaped members 76 and permits adjustment of the position of the cylinder 67 axially of the housing of the spindle 11.

Within the cylinder 67 are an upper piston 86 and a lower piston 87 opposite from it. A compression spring 88 bears against each piston 86 and 87 biasing the upper piston 86 upwardly and the lower piston 87 downwardly. Therefore, when the system is de-energized, the upper piston 86 engages the cylinder head 68 and the lower piston 87 engages the radial wall 70.

The upper piston 86 is provided with a central opening 89 that receives, with a press fit, the necked-down upper end part of a post 90 that projects downwardly from the upper piston. The post 90 is aligned with the rod 45 and its lower end 91 is adjacent but spaced from a radial end flange 92 at the upper end of the rod 45 when the system is in the de-energized condition.

The lower piston 87 includes a central opening and a downward tubular extension 93 that receives the post 90. O-rings 94 and 95 seal the post 90 with respect to the lower piston 87 and its tubular extension 93. The lower portion 96 of the extension 93 of the piston 87 is of reduced diameter and fits within a sleeve 97 which is carried by the cylindrical extension 71 and secured to it by engaging a narrow shoulder 98 at one end and a lock ring 99 at the other. The lower piston extension 96 is sealed with respect to the sleeve 97 by means of an O-ring 100. Another O-ring 101 seals the exterior of the sleeve 97 relative to the cylindrical extension 71.

The lower piston extension 96 extends around the upper end flange 92 of the rod 45. A radial wall 104 is at the lower end of the piston extension 96 beneath the flange 92, having a central opening 105 that receives the rod 45 and provides a clearance around it.

The pistons 86 and 87 are operated pneumatically. Pressurized air to move the pistons 86 and 87 is introduced through a member 106 to which is attached an air line 107 for operating the upper piston 86, and another air line 108 for the lower piston 87. The member 106 includes a sleeve 109 that extends downwardly through the end cap 59, to which it is secured by a lock ring 110. The sleeve 109 terminates within an opening 111 in the cylinder head 68 where it is sealed by an O-ring 112. Within the sleeve 109 is a tube 113 that is spaced from the inner wall of the sleeve so as to provide an annular passageway 114. This passageway provides communication from the fitting 107 to the upper end of the upper piston 86.

The tube 113 extends beyond the sleeve 109 into a central opening 116 in the post 90, where it is sealed by an O-ring 117. The lower end of the opening 116, beyond the tube 113, communicates with opposed radial passageways 119 in the post 90. The latter passageways connect to an annular recess 120 in the inner wall of the piston extension 93 which, through an additional radial passageway 121 through the piston extension 93, connects to the clearance space 122 that exists between the piston extension 93 and the cylinder extension 71. Therefore, air from the line 108 can pass through the passageway 118 in the tubular member 112 into the lower part of the opening 116, from where it can pass through the openings 119, 120 and 121 to the space 122. This provides pressurized air beneath the piston 87.

When the collet 10 is to be closed on the shank 15 of the drill 16 which has been positioned within the opening 14 in the basket 13, pressurized air is provided to the piston 86 through the passageway 114. This moves the piston 86 downwardly against the opposition of the spring 88 to bring the lower end 91 of the post 90 into engagement with the abutment provided by the end flange 92 of the rod 45. As this movement takes place, air can vent from within the cylinder 67 through a passageway 123 in the lower piston 87. The post 90 then pushes downwardly on the rod 45 which causes the wedge member 34 likewise to be pressed downwardly. As this occurs, the upper tapered surface 36 of the wedge member 34 slides along the upper tapered surface 29 of the basket 13 to compress this portion of the basket. This occurs because the wedge member 34 is confined by the cylindrical wall 32 of the opening in the shaft 12 so that it cannot spread apart at the slots 35. This wedging action on the matching tapers 36 and 29 causes the basket to grip the shank 15 of the drill 16 at a location near the upper end of the shank.

After the wedge member 34 grips the basket 13 at its upper end, it moves the basket downwardly with it. This causes the tapered basket surface 27 to slide along tapered shaft surface 31, compressing the lower portion of the basket. As a result, the shank 15 of the drill 16 is gripped at a second location by the lower portion of the basket 13.

The wedge member 34 then frictionally grips the inside of the shaft 12 along the surface 32 as the individual segments between the slots 35 are forced outwardly by the wedging action.

After the rod 45 has been moved downwardly to cause the basket 13 to grip the shank 16, the air pressure on the piston 86 is relieved, allowing this piston to be returned by the spring 88 to its normal position in engagement with the cylinder head 68. This causes the post 90 to be withdrawn and become spaced from the flange 92 at the end of the rod 45. However, the basket 13 continues to grip the shank 15 and will do so as long as the tool 16 is to be used. This is because the shallow tapers at the surfaces 29 and 36 and at the surfaces 27 and 31 are self-holding tapers. That is to say, these tapers remain frictionally locked, without relative movement, exerting their full holding force on the shank 15 in the absence of any axial force on the rod 45. A self-holding taper is generally regarded as one like the Morse and Brown & Sharpe where the angle of taper is 2° or 3°, according to Machinery's Handbook, sixteenth edition, page 1467.

The holding force on the tool shank 15 is particularly great because the shank is gripped at two locations. This also holds the shank more rigidly than in conventional collets, preventing the shank from rocking back and forth relative to the collet. Nevertheless, the force required to close the collet is relatively small because the two sets of matching tapers are set in series as the basket 13 is compressed at its upper end by the wedge member 34 and moved axially to be compressed by the shaft 12 at its lower end.

Opening of the collet to permit release of the shank 15 is accomplished by movement of the piston 87 as a result of admitting pressurized air from the line 108 to its undersurface, as discussed above. As the piston 87 is moved upwardly by air pressure, the radial end wall 104 of the piston extension 98 is brought into engagement with the undersurface of the flange 92 of the rod 45. This pulls upwardly on the rod 45 and hence on the wedge member 34. The collet will then be released as the surface 36 of the wedge member is moved upwardly relative to surface 29 of the basket 13 and the surface 27 of the basket is moved upwardly relative to the tapered surface 31 of the shaft 12.

The flanges 25 and 26 of the basket provide abutments that are necessary to assure collet release at both planes of gripping engagement with the shank 15 of the drill 16. For example, if the wedge member 34 initially moves relative to the basket 13, the shank 15 will be released at the upper plane of engagement. Thereafter, the shoulder 39 of the wedge member 34 acts as an abutment that will engage the flange 26 of the basket and pull the basket 13 upwardly so that the lower portion of the basket is no longer compressed by the tapered surface 31 of the shaft. Upward movement of the basket is terminated by engagement of the flange 25 of the basket with the abutment formed by the end 30 of the shaft 12.

It may occur also that the wedge member does not initially move relative to the basket 13, but instead pulls upwardly on the basket 13 as a result of the engagement between the wedge member surface 36 and the basket surface 29. In that event, the gripping force initially is released at the lower plane of engagement with shank 15. Subsequently, the flange 25 of the basket 13 will engage the end 30 of the shaft 12, precluding further upward movement of the basket 13. Necessarily, then, the wedge member 34 will be moved upwardly relative to the basket 13 to release the upper gripping plane. In both cases, release of the two gripping areas is sequential.

When the upward movement of the piston 87 has taken place to effect release of a collet 10, the air pressure is relieved beneath the piston 87 allowing the spring 88 to return that piston to its position of engagement with the radial wall 70 of the cylinder 67. This positions the end wall 104 of the piston extension 98 so that it is spaced below the flange 92 of the rod 45 and there will be no engagement with the flange of the rod. Hence, the rod 45 can rotate with the shaft 12 without interference.

The positioning units 75 for the cylinder 67 are important in assuring that neither the end wall 104 nor the bottom end 91 of the post 90 will engage the end flange 92 of the rod 45 as the spindle rotates the cutting tool. Inasmuch as the pistons 86 and 87 bottom out against the cylinder head 68 and the radial wall 70 of the cylinder 67 to position the end of the post 91 and the end wall 104, the location of the cylinder 67 within the housing section 58 governs the location of the end 91 of the post 90 and the wall 104 with respect to the flange 92. This may be adjusted to assure proper clearance by rotation of the screws 79.

The basket 13 and wedge member 34 may be removed for servicing by first activating both the pistons 86 and 87 so that the flange 92 of the rod 45 is clamped between the post 90 and the wall 104. Then a screwdriver is inserted into the basket and wedge member from the lower end, where it can engage the wall of a transverse opening 124 in the wedge member. This allows the wedge member 34 to be unscrewed from the threaded end 46 of the rod 45 so that the wedge member and basket can be disassembled from the shaft 12. A mark 125 on the end of the basket 13 is aligned with the key 47 so that the components of the collet may be reassembled in the same relative rotational positions as before, thus preserving balance.

The foregoing detailed description is to be clearly understood as given by way of illustration and example only, the spirit and scope of this invention being limited solely by the appended claims.

What is claimed is:

1. A collet comprising
   a radially-compressible member having an opening adapted to receive the shank of a rotatable tool,
      said radially-compressible member having a first tapered exterior surface, and a second tapered exterior surface spaced from said first tapered exterior surface,
   a first means having a tapered surface engaging said first tapered exterior surface,
   a second means having a tapered surface engaging said second tapered exterior surface,
      the angles of the tapers of all of said tapered surfaces in interengagement being matching and that of self-holding tapers,
      said radially-compressible member being movable relative to said second means, said first means being movable relative to said radially-compressible member and said second means,
   means for applying a first force in one direction on said first means such as to cause said first means to move relative to said second means and said radially-compressible member in one direction so as to cause said tapered surface of said first means to react against said first tapered exterior surface and compress said radially-compressible member around the shank of such a tool so as to grip said shank at a first location, and to cause said tapered surface of said first means and said first tapered exterior surface to frictionally lock together, and thereafter to cause said first means to move said radially-compressible member relative to said second means in one direction so as to cause said tapered surface of said second means to react against said second tapered exterior surface and compress said radially-compressible member around the shank of such a tool so as to grip said shank at a second location, and to cause said tapered surface of said second means and said second tapered exterior surface to frictionally lock together,
   means for thereafter releasing said first force to allow said tapered surfaces to remain so locked and said radially-compressible member to grip said shank at two locations, whereby such a tool can be operated without an external force on said radially-compressible member, means for applying a second force in the opposite direction to cause relative movement of said radially-compressible member and said first means in the opposite direction and to cause relative movement of said second means and said radially-compressible member in the opposite direction, thereby to unlock said tapered surfaces and release said shank, and
   means for thereafter releasing said second force to allow said tapered surfaces to remain unlocked.

2. A device as recited in claim 1 in which said angles of said tapered surfaces in interengagement are substantially within the range of from 2° to 3°.

3. A device as recited in claim 1 in which said angles of said tapered surfaces in interengagement are substantially 3°.

4. A device as recited in claim 1 in which said first tapered exterior surface tapers toward one end of said radially-compressible member, and said second tapered exterior surface tapers and the other toward the opposite end of said radially-compressible member.

5. A device as recited in claim 1 in which said second means includes a rotatable shaft, and said first means includes a wedge member movable axially relative to said rotatable shaft, said rotatable shaft having an opening receiving said radially-compressible member and said wedge member, said tapered surface of said second means being in said opening.

6. A device as recited in claim 5 in which said radially-compressible member includes a first abutment means and a second abutment means, said shaft includes an abutment means, and said wedge member includes an abutment means,
said abutment means of said shaft being engagable with said first abutment means, and
said abutment means of said wedge member be engagable with said second abutment means upon said relative movement of said first means in said opposite direction and said relative movement of said second means in said opposite direction, for thereby causing said radially-compressible member to release said shank of said tool at both of said locations.

7. A device as recited in claim 5 in which said wedge member includes abutment means for effecting operation thereof, said means for applying a first force in one direction being engagable with said abutment means for so moving said wedge member in said one direction, and movable to a position remote from said abutment means for so releasing said first force, said means for applying a second force in the opposite direction being engagable with said abutment means for causing said movement of said wedge means in said opposite direction, and being movable to a position remote from said abutment means for so releasing said wedge member.

8. A device as recited in claim 5 in which
said wedge member is hollow, said tapered surface of said first means being an interior surface, said wedge member including a cylindrical exterior surface opposite said tapered interior surface thereof,
said shaft includes a cylindrical interior surface engaged by said cylindrical exterior surface of said wedge member, and said wedge member includes slots therein for allowing radial expansion and contraction of said wedge member, said cylindrical interior surface of said shaft preventing radial expansion of said wedge member upon said relative movement of said radially-compressible member and said first means in said one direction.

9. A device as recited in claim 7 including, in addition, means for adjusting said remote positions of said means for applying said first force and said means for applying said second force to assure that neither of said means then engages said abutment means.

10. A device as recited in claim 7 in which said wedge member includes an elongated rod, said abutment means being on said rod.

11. A device as recited in claim 10 in which said shaft has an axial opening therein, said elongated rod extending through said axial opening.

12. A device as recited in claim 10 in which said abutment means is an outwardly projecting flange on one end of said rod.

13. A device as recited in claim 7 in which said means for applying said first force, and said means for applying said second force include
a cylinder,
a first piston movable in said cylinder,
said first piston having means thereon for engaging said abutment means of said wedge member,
and a second piston in said cylinder opposed from said first piston,
said second piston having means thereon for engaging said abutment means of said wedge member.

14. A device as recited in claim 13 including adjustable means for positioning said means on said first piston and said means on said second piston so that they are spaced from said abutment means of said wedge member when said force is so released in said one direction and in said opposite direction.

15. A device as recited in claim 14 including resilient means biasing said first piston and said second piston to opposite ends of said cylinder for engagement with said ends of said cylinder, and in which said adjustable means includes means for positioning said cylinder relative to said abutment means.

16. A device as recited in claim 15 in which said means for positioning said cylinder relative to said abutment means includes a first resilient means biasing said cylinder axially in one direction; a second resilient means biasing said cylinder axially in the opposite direction, said second resilient means exerting a greater force on said cylinder than does said first resilient means, and an adjustable stop for limiting the movement of said cylinder axially in said opposite direction.

17. A device as recited in claim 16 including
a housing having a chamber therein,
said cylinder being received in said chamber and slidable axially thereof,
said first resilient means comprising a first spring biasing said cylinder toward one end of said chamber,
said second resilient means comprising at least one second spring biasing said cylinder toward the opposite end of said cylinder with a greater force than that of said first spring,
said adjustable stop limiting the movement of said cylinder in response to the force of said second spring.

18. A device for gripping and rotating a tool comprising a rotatable shaft having an axial opening extending inwardly from one end thereof,
said opening being defined by a tapered surface adjacent and tapering toward said one end, and a cylindrical surface inwardly of said tapered surface,
a basket of resilient material received in said opening, said basket having
a cylindrical opening extending therethrough adapted to receive the shank of a tool,
a first tapered exterior adjacent one end thereof and adjacent and engaging said tapered surface of said shaft, the taper of said first exterior surface matching the taper of said tapered surface of said shaft,
a second tapered exterior surface adjacent the opposite end thereof, said second exterior tapered surface being adjacent and spaced from said cylindrical surface and tapering in a direction opposite from that of said first exterior tapered surface, and a plurality of slots extending through said basket whereby said basket is radially compressible,
a wedge member of resilient material received in said opening in said shaft,
said wedge member having a portion having
a cylindrical exterior surface adjacent and engaging said cylindrical surface of said opening,
a tapered interior surface adjacent and engaging said second tapered exterior surface, the taper of said interior surface of said wedge member matching the taper of said second tapered exterior surface,
and a plurality of slots extending through said portion of said wedge member, whereby said portion of said wedge member is radially expansible,
the angles of all of said tapered surfaces which are in interengagement with each other being such that the tapers are self holding, and
force means movable from a position remote from said wedge member to a position of engagement therewith for applying a force to said wedge member to cause movement thereof toward said one end of said shaft so that said tapered interior surface of said wedge member slides along said second tapered exterior surface of said basket as said exterior surface of said wedge member is confined by said cylindrical surface of said shaft, thereby to compress said basket locally and grip at one location the shank of a tool received in said cylindrical opening in said basket, and to cause movement of said basket relative to said shaft so that said first tapered exterior surface slides along said tapered interior of said shaft, thereby to compress said basket locally and grip at a second location the shank of such a tool,
said force means being thereafter movable to a position remote from said wedge member for leaving said interengaged tapered surfaces frictionally locked and gripping said shank in two locations without the application of an external force.

19. A device as recited in claim 18 including, in addition, a second force means movable from a position remote from said wedge member to a position of engagement therewith for applying a force to said wedge member to cause movement thereof and of said basket in the opposite direction to release said frictionally locked tapered surfaces and thereby release the shank of a tool received in said basket, said second force means being thereafter movable to a position remote from said wedge member.

20. A device as recited in claim 19 in which said basket includes a first abutment and a second abutment, said shaft includes an abutment, and said wedge member includes an abutment, said first abutment of said basket being engageable with said second abutment of said basket upon said movement of said wedge member and of said basket in the opposite direction for assuring that said basket so moves in the opposite direction a limited distance so as to cause release of said frictionally locked tapered surfaces.

21. A device as recited in claim 20 in which said first and second abutments of said basket comprise a first flange adjacent said one end of said basket and a second flange adjacent said opposite end of said basket, and said abutment of said wedge member comprises an internal shoulder.

22. A device as recited in claim 21 in which said first flange is located exteriorly of said opening in said shaft, and said abutment of said shaft is an end surface thereof beyond said opening in said shaft.

23. A device as recited in claim 18 in which said basket and said wedge member include interengaged means for rotationally positioning said basket relative to said wedge member at a plurality of selected locations, whereby a relative rotational position of minimum runout may be selected.

24. A device as recited in claim 23 in which said slots in said portion of said wedge member extend axially, and said means for rotationally positioning said basket relative to said wedge member includes at least one outwardly projecting element received in one of said slots in said portion of said wedge member.

25. A device as recited in claim 18 including means rotationally coupling said wedge member to said shaft, and indicia on said basket indicating the rotational position of said basket relative to said shaft, whereby said basket, wedge member and shaft may be disassembled and subsequently reassembled in the same relative rotational position to assure reassembly at said position of minimum runout.

26. The method of gripping and operating a tool comprising the steps of
providing a radially-compressible member having a cylindrical opening adapted to receive the shank of a tool, a first exterior surface tapering in one direction and a second exterior surface tapering in the opposite direction,
providing a rotatable shaft having an opening therein receiving said radially-compressible member, with said opening being provided with a tapered surface engaging and at the same angle as said first exterior surface so as to provide a first pair of matching tapers,
providing a second member having an opening therein having a tapered surface having the same angle of taper as that of said second exterior surface,
positioning said second exterior surface within said opening in said second member adjacent said tapered surface thereof so as to provide a second pair of matching tapers,
the angles of the tapered surfaces of said first and second pairs of matching tapers being such that said tapers are self-holding,
positioning the shank of a tool within said cylindrical opening,
then applying a force to said second member so as to move said second member axially in one direction relative to said radially-compressible member for causing said tapered surface of said second member to react against said second exterior surface so as to compress said radially-compressible member adjacent thereto for gripping said shank at one location, and thereafter causing said second member to move said radially-compressible member axially in one direction relative to said shaft so that said first exterior surface reacts against said tapered surface of said shaft and said radially-compressible member is compressed adjacent thereto for gripping said shank at a second location,
and then removing said force from said second member so that said first and second pairs of matching tapers remain frictionally locked together without the application of an exterior force and said shank continues to be gripped in said two locations,
and then rotating said shaft and with it said shank for causing operation of said tool.

27. The method as recited in claim 26 in which for so applying a force to said second member an additional member is moved from a location remote from said second member to a position of engagement therewith for pushing on said second member, and for so removing said force said additional member is moved from said position of engagement with said second member to said position remote therefrom.

28. The method as recited in claim 27 including the step of moving said second member axially in the opposite direction relative to said radially-compressible member, and moving said radially-compressible member axially in the opposite direction relative to said shaft following operation of said tool for causing said first and second pairs of tapers to be no longer frictionally locked together for releasing said shank.

* * * * *